July 8, 1941. S. P. JOHNSON 2,248,176
PLANTER
Filed Nov. 30, 1940 2 Sheets-Sheet 2
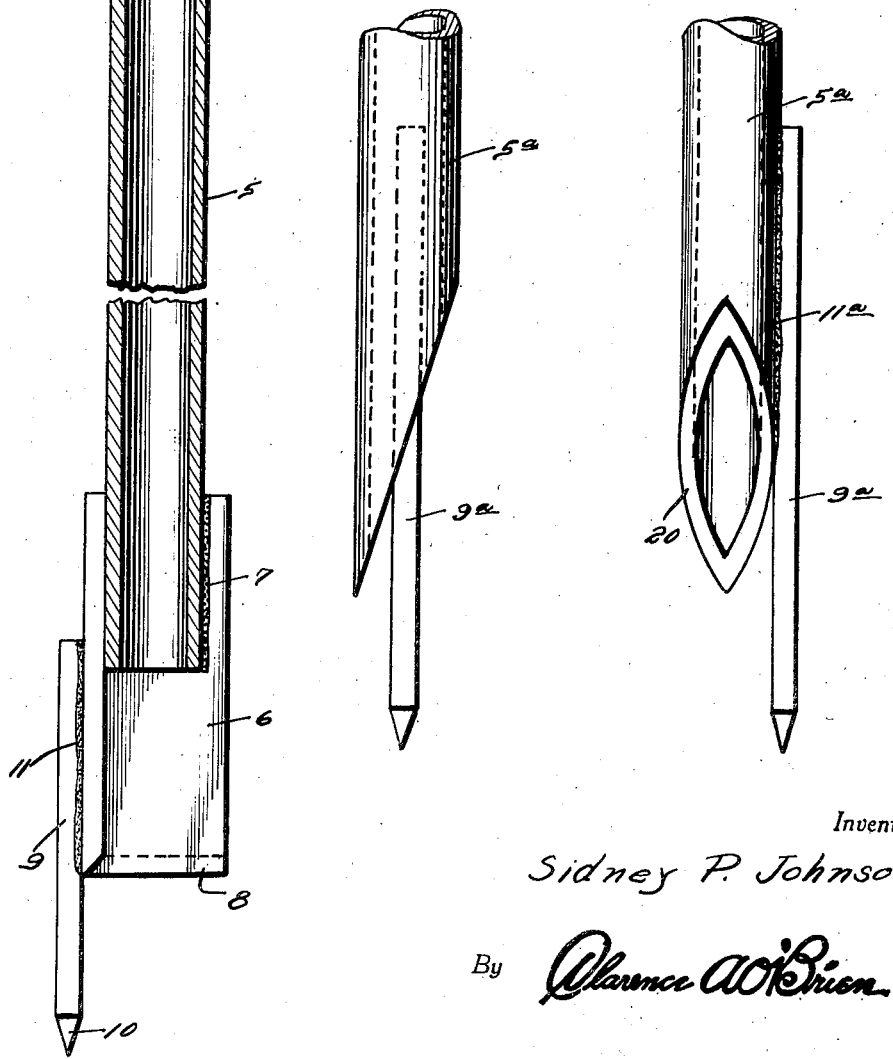
Inventor
Sidney P. Johnson
By Clarence A. O'Brien
Attorneys Patented July 8, 1941

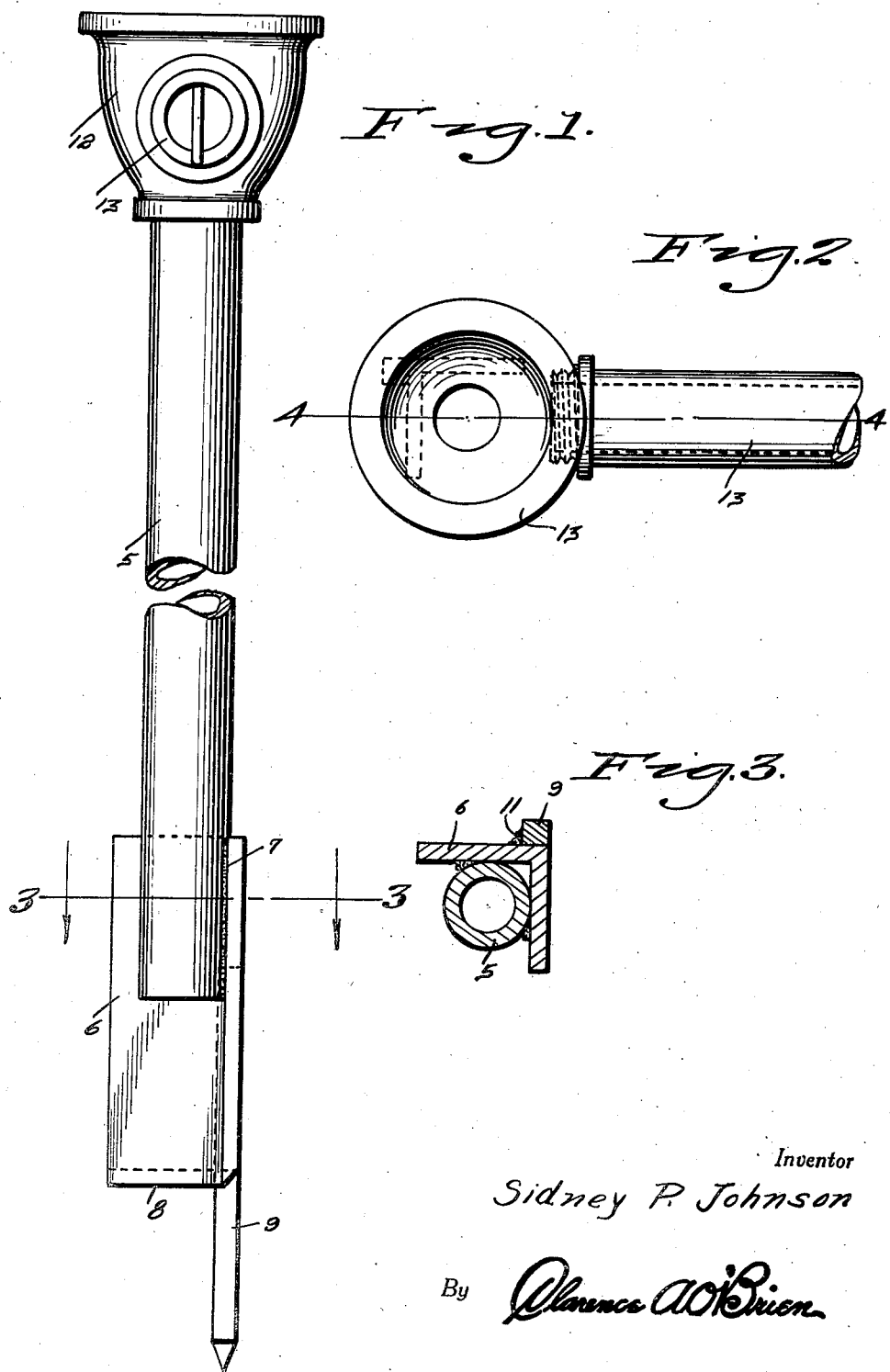

2,248,176

UNITED STATES PATENT OFFICE 2,248,176

PLANTER

Sidney P. Johnson, Birmingham, Ala.

Application November 30, 1940, Serial No. 368,066

2 Claims. (Cl. 111—92)

This invention relates to new and useful improvements in planters and more particularly to a hand planter or implement.

The principal object of the present invention is to provide a planting implement of the character stated which can be readily actuated to form an opening to receive a seed and then to cover the seed with earth.

Another important object of the invention is to provide a planting device of the character stated which is of simple construction and easy to manipulate.

Other objects and advantages of the invention will become apparent to the reader of the following specification.

In the drawings—

Figure 1 represents a side elevational view of the implement.

Figure 2 is a fragmentary top plan view.

Figure 3 is a section on line 3—3 of Figure 1.

Figure 4 is a longitudinal sectional view taken substantially on line 4—4 of Figure 2.

Figure 5 is a fragmentary side elevational view of a modified form of planting implement.

Figure 6 is another side elevational view fragmentarily showing the modified form disclosed in Figure 5.

Referring to the drawings wherein like numerals designate like parts, it can be seen that numeral 5 denotes an elongated tube, the upper end of which is threaded. Numeral 6 denotes an angle iron member in which the lower end of a tube 5 is disposed and to which said tube is welded in which the lower end of the tube 5 is disposed and to which said tube is welded as at 7, the lower portion of the angle member 6 depending below the lower end of the tube 5 and having its lower end beveled as at 8 to define a cutting edge. Numeral 9 denotes a pivot pin, pointed at its lower end as at 10 while its upper portion is welded or otherwise secured as at 11 to the outside corner portion of the angle member 6.

A cup 12 for receiving seeds, has the threaded opening in its bottom to receive the upper threaded end of the tube 5. The cup 12 has a threaded opening in a side portion thereof for receiving the threaded end of a tubular handle 13.

A cleaner generally referred to by numeral 14 is normally kept in the handle 13 but should be pulled out and used for cleaning out the lower end of the tube 5, in the event mud or debris is collected therein. The cleaner 14 consists of an elongated metal strip to provide a long leg 15 and a short leg 16, the bight portion having a laterally offset portion 17 to define a stop preventing the cleaner from entering the handle 13 too far. A hook or laterally disposed lug 18 is provided at the free end of the long leg 15 and this is used in extracting foreign matter from the lower end of the tube 5.

In the use of the device, the pivot point 9 is driven into the ground to such an extent that the lower end of the angle member 6 has entered the ground for a distance of approximately one-half of an inch. The handle 13 and tube 5 are now rotated for from 45 to 80 degrees, thus buckling up the earth and leaving an opening into which a seed is dropped. The seed is dropped into the cup 12 and descends by dropping into the opening which is held open by the angle member 6. By rotating the implement another 45 to 80 degrees, the earth settles back into the opening, thus covering the deposited seed.

A modification of the invention is shown in Figures 5 and 6 wherein a tube 5a has a pivot pin 9a welded as at 11a immediately to the same, thus dispensing with an angle plate 6. In this form of the invention, it will be observed that the lower end of the tube 5a is cut off obliquely as at 20 and obviously by rotating the tube 5a clockwise an opening can be formed into which a seed can be dropped through the tube 5a.

While the foregoing specification sets forth the invention in specific terms, it is to be understood that numerous changes in the shape, size of materials may be resorted to without departing from the spirit and scope of the invention as claimed hereinafter.

What is claimed is:

1. A planter comprising an elongated tube open at its upper and lower ends, a handle extending laterally from the upper end of the tube, and a cutter at the lower end of the tube, a pivot pin projecting from said cutter.

2. A planter comprising an elongated tube open at its upper and lower ends, a handle at the upper end of the tube for rotating the tube, a cutter formation at the lower end of the tube for cuting an opening in the earth when the tube is rotating, and a depending pivot pin at the lower end of the tube.

SIDNEY P. JOHNSON.